(12) United States Patent
Polgrean (10) Patent No.: US 9,656,699 B1
(45) Date of Patent: May 23, 2017

(54) TRAILER FAIRING ACCESS PANEL

(71) Applicant: Heil Trailer International, Co., Cleveland, TN (US)

(72) Inventor: Brian Polgrean, Ephrata, PA (US)

(73) Assignee: HEIL TRAILER INTERNATIONAL, CO., Cleveland, TN (US)

( * ) Notice: Subject to any disclaimer, the term of this patent is extended or adjusted under 35 U.S.C. 154(b) by 0 days.

(21) Appl. No.: 14/935,140

(22) Filed: Nov. 6, 2015

(51) Int. Cl.
| | | |
|---|---|---|
| *B60P 3/22* | (2006.01) | |
| *B62D 35/00* | (2006.01) | |
| *B62D 63/08* | (2006.01) | |
| *B60T 17/20* | (2006.01) | |

(52) U.S. Cl.
CPC .......... *B62D 35/001* (2013.01); *B60P 3/2205* (2013.01); *B60T 17/20* (2013.01); *B62D 35/008* (2013.01); *B62D 63/08* (2013.01)

(58) Field of Classification Search
CPC .... B62D 35/001; B62D 35/008; B62D 63/08; B60P 3/2205; B60T 17/20
USPC ................................................. 280/837, 839
See application file for complete search history.

(56) References Cited

U.S. PATENT DOCUMENTS

| | | | | |
|---|---|---|---|---|
| 2,871,872 A | * | 2/1959 | Rowles ..................... | B60T 7/12 137/351 |
| 3,026,004 A | * | 3/1962 | Rowell .................... | B60P 3/226 180/286 |
| 4,135,596 A | * | 1/1979 | Silba ....................... | B60P 3/2265 137/355.16 |
| 8,132,639 B2 | * | 3/2012 | Zuck ....................... | B60K 28/10 141/346 |
| 2009/0189414 A1 | * | 7/2009 | Boivin ................. | B62D 35/001 296/180.4 |
| 2011/0048572 A1 | * | 3/2011 | Batson ..................... | B64F 1/28 141/1 |

* cited by examiner

*Primary Examiner* — Anne Marie Boehler
*Assistant Examiner* — Marlon A Arce
(74) *Attorney, Agent, or Firm* — McGuireWoods LLP (57) ABSTRACT

A trailer having an aerodynamic skirt that includes a valve access panel is disclosed. The trailer includes a tank for transporting cargo and a valve at the base of the tank for accessing unloading the cargo from the trailer. The aerodynamic skirt extends along a first side of the trailer body that includes the valve and a valve access panel that is configured to cover the valve when closed and to allow access to the valve when open. The apparatus also includes a trailer brake interlock that is communicatively coupled to the valve access panel and a trailer brake to restrict motion of the trailer when the valve access panel is open and to permit motion of the trailer when the valve access panel is closed.

9 Claims, 9 Drawing Sheets

TRAILER FAIRING ACCESS PANEL

BACKGROUND

The present invention relates generally to a trailer body that includes an aerodynamic skirt.

DESCRIPTION OF THE RELATED ART

Many materials are conveniently transported by truck. Trucks that are used to transport materials commonly include a tractor and an attached trailer having a tank or other container mounted thereon. Such trailers may also be loaded on railcars or barges, or a container may be mounted directly on a railcar or barge. Such trailers may be attached to tractor trailers and used as shipping containers in larger freight operations, such as rail and ship-based transportation systems.

Depending on the cargo being transported, a trailer may include a sealed tank that is attached to a frame and may be used to haul many types of cargo, including fluids and particulate materials. For example, the tanks may be used to haul any variety of fluids, from dairy to petrochemicals. Many particulate materials are also transported by truck, railcar, barge or by other means. Particulate materials that are generally transported in pneumatic containers include agricultural products such as grain, corn kernels, beans, flour, sugar, peanuts and the like, light-weight aggregate products, and intermediate products for various industrial uses such as plastic pellets, powders, coke, lime, silica gel, powdered acid resins, rare earth powders, powdered alumina, and so forth. Frequently, these transport containers are referred to as pneumatic containers because of the pneumatic method, involving gas or air-entrainment, by which they may be loaded and unloaded.

Pneumatic containers generally include one or more product compartments that are cylindrical or rounded in shape in order to facilitate unloading by a method that involves pressurizing the compartments or by using gravity to cause the contents of the trailer to flow out of a valve at the base of the container. Each product compartment may be provided with a discharge hopper that may be generally cylindrical or conical in shape. Each discharge hopper may have a material outlet at the bottom and a valve which controls the flow of material through the outlet. Liquid carrying containers may be emptied using a similar valve and outlet.

The container may be mounted on a frame or chassis that forms the undercarriage of a trailer. The product compartments of the container are generally enclosed by a sheet metal sheath, although the front of the sheath enclosure usually has a flat or nearly flat face. Further, the valves and associated pipe elements that connect the valves to the tank container may be located along the bottom of the tank along the undercarriage of the trailer.

SUMMARY

In accordance with an illustrative embodiment, a trailer includes a trailer body having an undercarriage. The trailer further includes a drivetrain coupled to the undercarriage. The drivetrain includes one or more wheels and a brake that is operable to restrict movement of the wheels. A valve is coupled to a container of the trailer body and is positioned along a first side of the undercarriage. The valve is oriented such that a valve outlet is directed away from the first side of the undercarriage. The trailer includes an aerodynamic skirt that extends along the first side of the undercarriage. The aerodynamic skirt comprising a valve access panel proximate the valve. The valve access panel is movable between an open position and a closed position, and permits access to the valve when in an open position and covers the valve when in a closed position. In addition, the trailer includes an interlock coupled to the brake and to the valve access panel. The interlock is operable to engage the brake when the valve access panel is moved from the closed position.

In accordance with another illustrative embodiment, a method of accessing a trailer container includes actuating a handle of a valve access panel, moving the valve access panel from a closed position to an open position, actuating a valve coupled to the container to cargo from the container via the valve, closing the valve, and moving the valve access panel from the open position to the closed position.

In accordance with another illustrative embodiment, a valve access system includes a valve access panel coupled to a trailer body and a brake interlock. The valve access panel is operable to restrict access to a valve when in a closed position and to allow access to the valve when in an open position. The brake interlock is operatively coupled to a brake and operable to engage the brake when the valve access panel is moved from the closed position.

Additional details of the disclosed embodiments are provided below in the detailed description and corresponding drawings.

DETAILED DESCRIPTION

The following detailed description is provided to assist the reader in gaining a comprehensive understanding of the methods, apparatuses, and/or systems described herein. Throughout the drawings and the detailed description, unless otherwise described, the same drawing reference numerals will be understood to refer to the same elements, features, and structures. The relative size and depiction of these elements may be exaggerated for clarity, illustration, and convenience.

The present disclosure relates to tank trailer having one or more valves positioned near the bottom of the tank for extracting cargo from the tank, and more specifically to an access panel that covers the valves when the valves are not being accessed. The panel is communicatively coupled to a trailer brake and is thereby operable to engage a trailer brake when the panel is open and to disengage the brake when the panel is closed.

The illustrative embodiments provide an aerodynamic skirt, which may also be referred to as a fairing, which improves the aerodynamic characteristics of tank trailers and provides secure access to valves disposed under the body of the trailer's tanks. The fairing may be positioned, adjusted, and customized to fit trailers of different types. During installation, the aerodynamic skirt may be bent, trimmed, cut, adjusted, or otherwise modified to fit the selected trailer. The installation may accommodate valves, pipes, gauges, hoses, storage components, hoppers, or suspension of the trailer, in addition to any variances in frame size.

The aerodynamic skirt is attached to a trailer body and includes a valve access panel. The valve access panel is movable between an open position and a closed position to alternatingly cover or provide access to a valve of the trailer. The aerodynamic skirt also includes an interlock having a locked position and an unlocked position. The interlock is actuated in response to the valve access panel being moved from the closed position. When actuated, the interlock engages a trailer brake to prevent the trailer from moving while the valves are being accessed. Similarly, the interlock disengages the brake in response to the valve access panel being moved to the closed position.

Figure 1A:
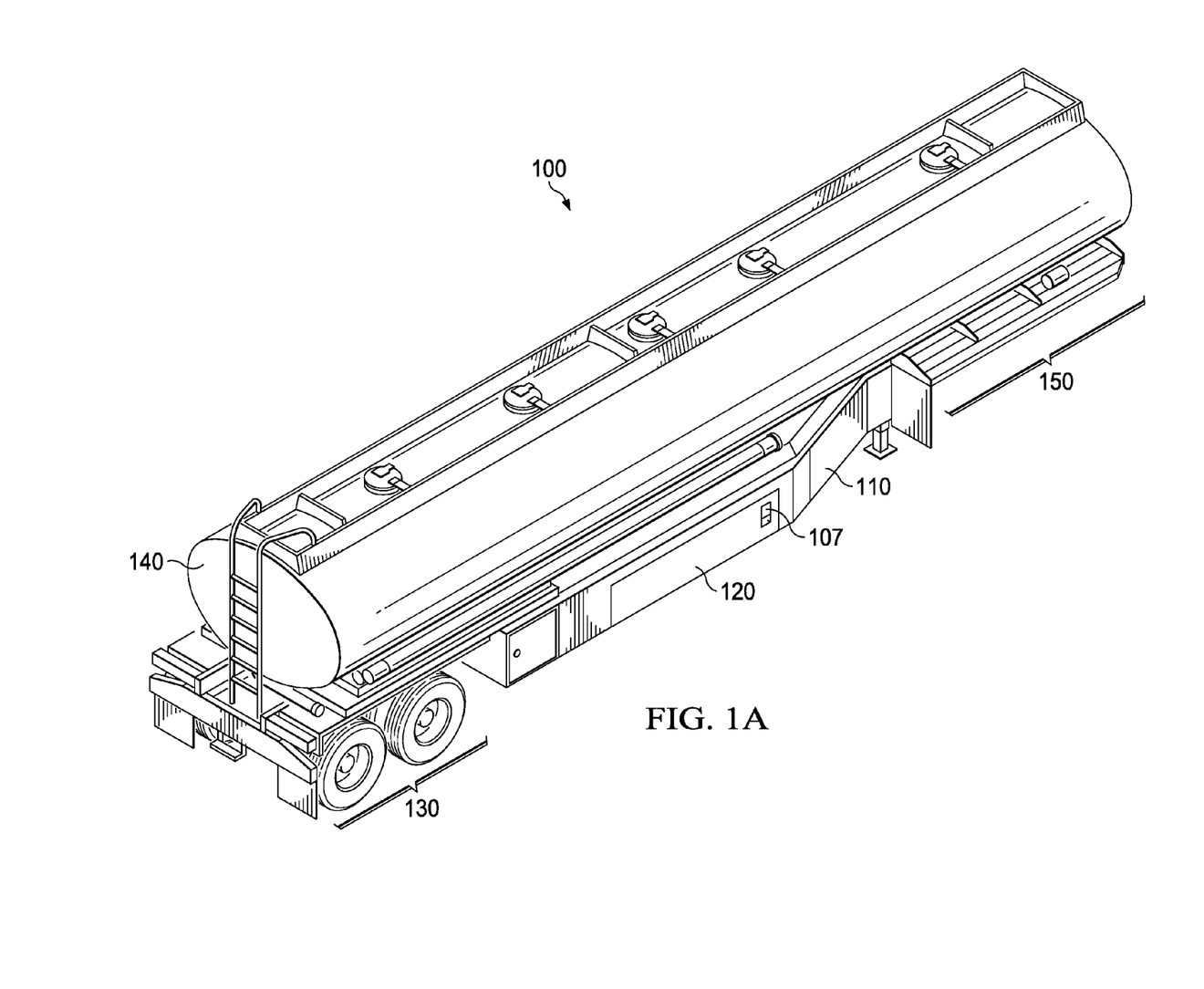
FIG. 1A is a schematic, perspective view of a trailer with an aerodynamic skirt that includes a closed valve access panel.

The illustrative embodiments of the present disclosure are discussed in more detail with regard to the figures. To that end, FIG. 1A shows a trailer 100 with an aerodynamic skirt 110 that includes a closed valve access panel 120. The aerodynamic skirt 110, or fairing, is attached along the lower side edges of the trailer 100 between an undercarriage wheel assembly 130 located at the back of the trailer container 140 and a trailer hitch portion 150 such that valves 101 that are located in the same area are covered by the fairing 110 such that the valves are directly behind the valve access panel 120 when the panel is closed. The access panel 120 in this view is in a closed and unlocked position. The access panel 120 may be opened and closed using a keyed or unkeyed handle 107, as described in more detail below. In the closed position, the valve access panel 120 is flush with the adjacent portion of the aerodynamic skirt 110 and a safety brake coupled to the undercarriage wheel assembly 130 is disengaged to allow the trailer 100 to move.

Figure 1B:
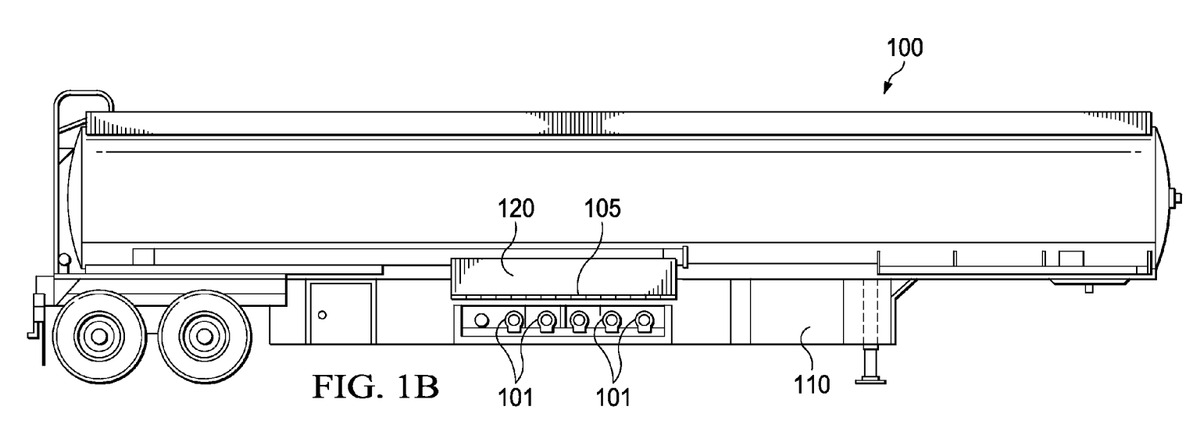
FIG. 1B is a schematic, side view of the trailer of FIG. 1A showing the access panel in an open position.
Figure 1C:
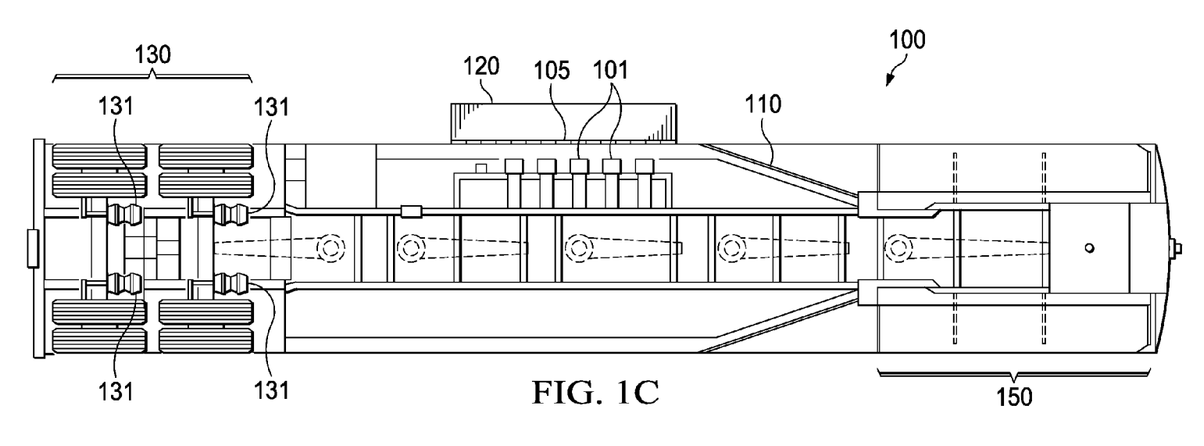
FIG. 1C is a schematic, bottom view of the trailer of FIG. 1A, showing the access panel in an open position.

FIG. 1B is a side view of the trailer 100. In FIG. 1B, the valve access panel 120 of the aerodynamic skirt 110 is in an open position, having been swung upward about an upper hinge 105 that couples the access panel 120 to the aerodynamic skirt 110. In the open position, the valves 101 are accessible by an operator so that cargo can be unloaded from the trailer 100. FIG. 1C is a bottom view of the trailer 100 with the attached aerodynamic skirt 110 that includes the open valve access panel 120. The aerodynamic skirt 110 extends along the undercarriage of the trailer 100 from the trailer hitch 150 portion of the trailer towards the back end of the trailer ending where the undercarriage wheel assembly 130 begins. The aerodynamic skirt 110 thereby isolates pipes, valves 101, and other elements along the underside of the trailer 100 from aerodynamic forces, thereby reducing drag on the trailer 100 when traveling at operational speeds. In this open and locked position the undercarriage wheel assembly 130 is locked by, for example, air brakes, 131 which are communicatively coupled to the valve access panel 120 so that the movement of the trailer 100 will be restricted when the valves 101 are accessible.

While the trailer 100 is generally described as having an access panel 120 that opens about a horizontal hinge 105, any other suitable opening mechanism may be interchanged without departing from the spirit of this disclosure. For example, the access panel 120 may be mounted with a linkage that allows the panel 120 to pivot up and away from the trailer body when open, or by a sliding door that opens and slides toward the front or rear of the trailer 100 along a horizontal track. Similarly, the access panel 120 may be a plurality of similarly operated distinct access panels 120, each covering a set of one or more valves 101.

In the figures, the reference numerals for similar components or features may be indexed by 100 and not discussed further for brevity.

Figure 2:
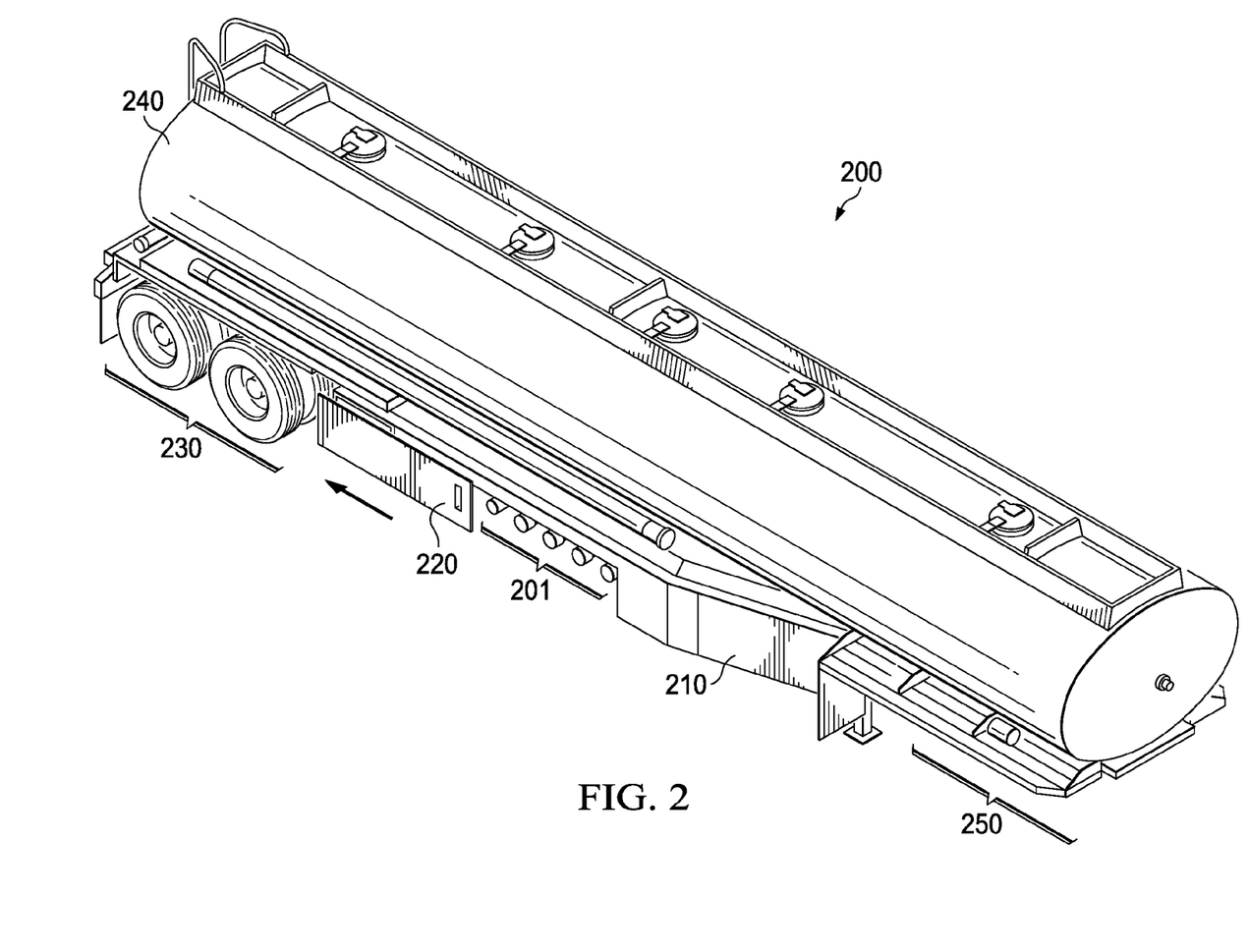
FIG. 2 is a schematic, perspective view of a trailer with an aerodynamic skirt that includes a sliding valve access panel in an open configuration.

Referring now to FIG. 2, a trailer 200 is shown having an aerodynamic fairing 210 that includes a valve access panel 220. The valve access panel 220 is a sliding panel that slides horizontally toward the rear of the trailer 200. In an alternative embodiment, the valve access panel 220 may slide toward the front of the trailer 200, upward, or downward, provided that adequate clearance is available to access the valves 201. As described in more detail below, the valve access panel 220 is communicatively coupled to a trailer brake, such that when the valve access panel 220 is opened, the trailer brake is actuated by an interlock mechanism and the drivetrain 230 of the trailer 200 is restricted from movement. In the open position, the valves 201 may be accessed to unload the contents of the trailer 200. Correspondingly, when the valve access panel 220 is closed, the interlock mechanism disengages the brake and the drivetrain 230 of the trailer 200 is not restricted by the brake.

Figure 3A:
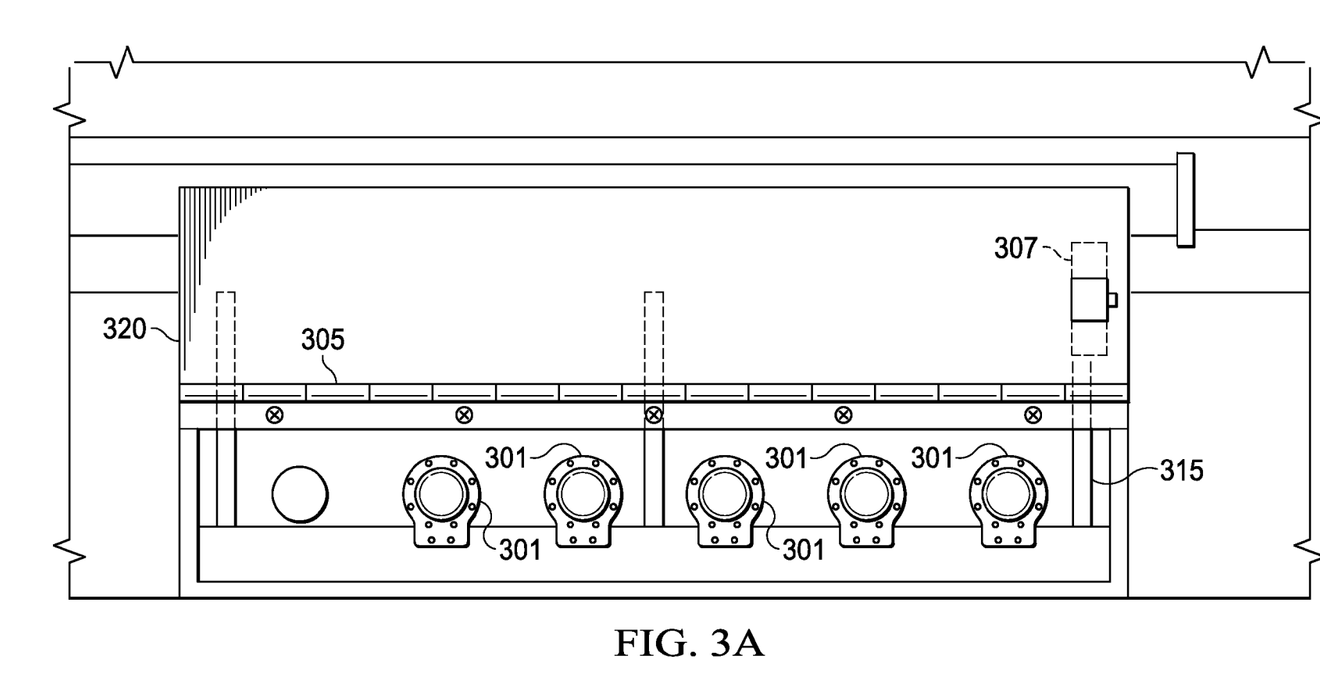
FIG. 3A is a schematic, side view of a portion of a valve access panel having a top-edge hinge.
Figure 3B:
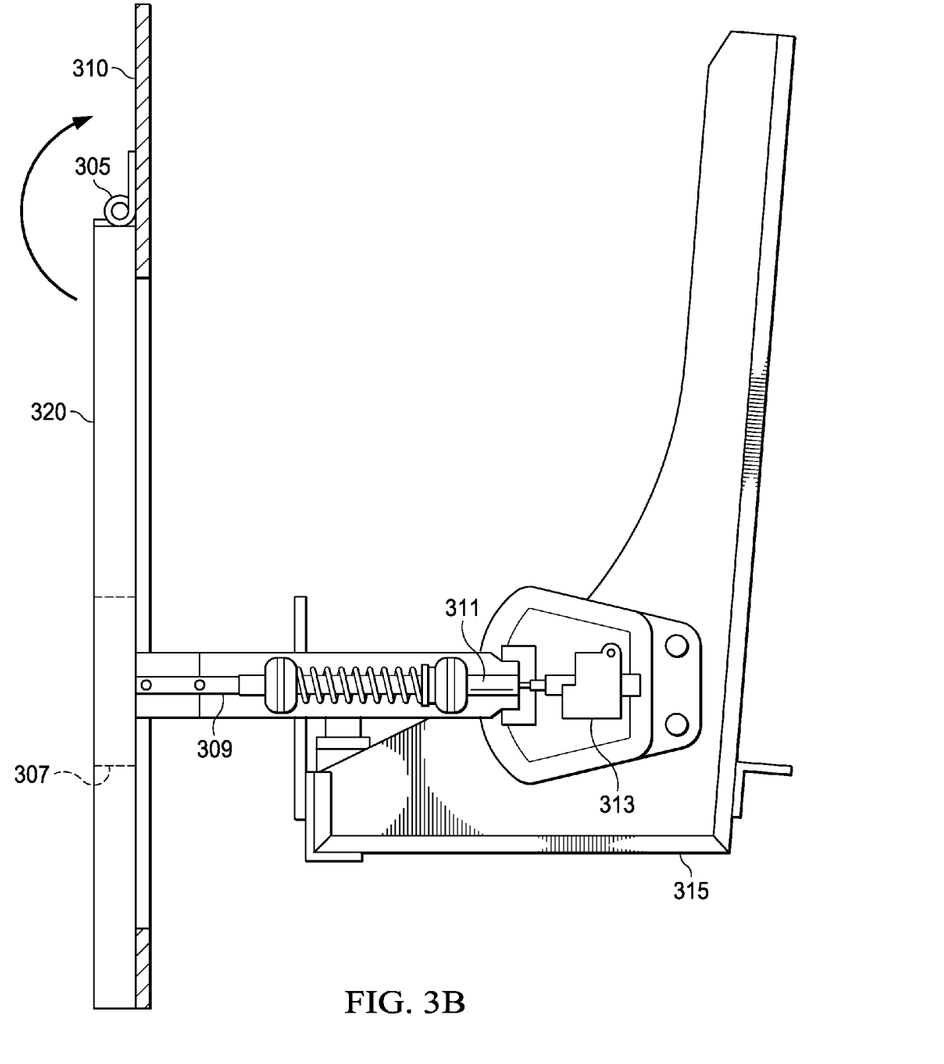
FIG. 3B is a schematic, front view of the portion of the valve access panel of FIG. 3A.

FIGS. 3A and 3B show another embodiment of a valve access panel 320 that operates similarly to the embodiments described above. The valve access panel 320 is coupled to, and forms a part of, a portion of an aerodynamic skirt 310 that extends below the body of a trailer, as shown in FIGS. 1A-2. The valve access panel 320 includes a handle 307 for opening and closing the valve access panel 320 to provide access to valves 301. A hinge 305 couples the valve access panel to a portion of the aerodynamic skirt 310. The handle 307 is coupled to a linkage 309, which may be a spring-biased piston that is coupled to an actuator 311. The actuator 311 includes a controller 313 that is coupled to a brake system of the trailer. In an embodiment, the brake is a hydraulic brake that is coupled to the drivetrain of the trailer via a control line. In another embodiment, the brake is a hydraulic or other suitable mechanical brake that is actuated by an electronic signal, rather than by a purely mechanical actuator.

Figure 4A:
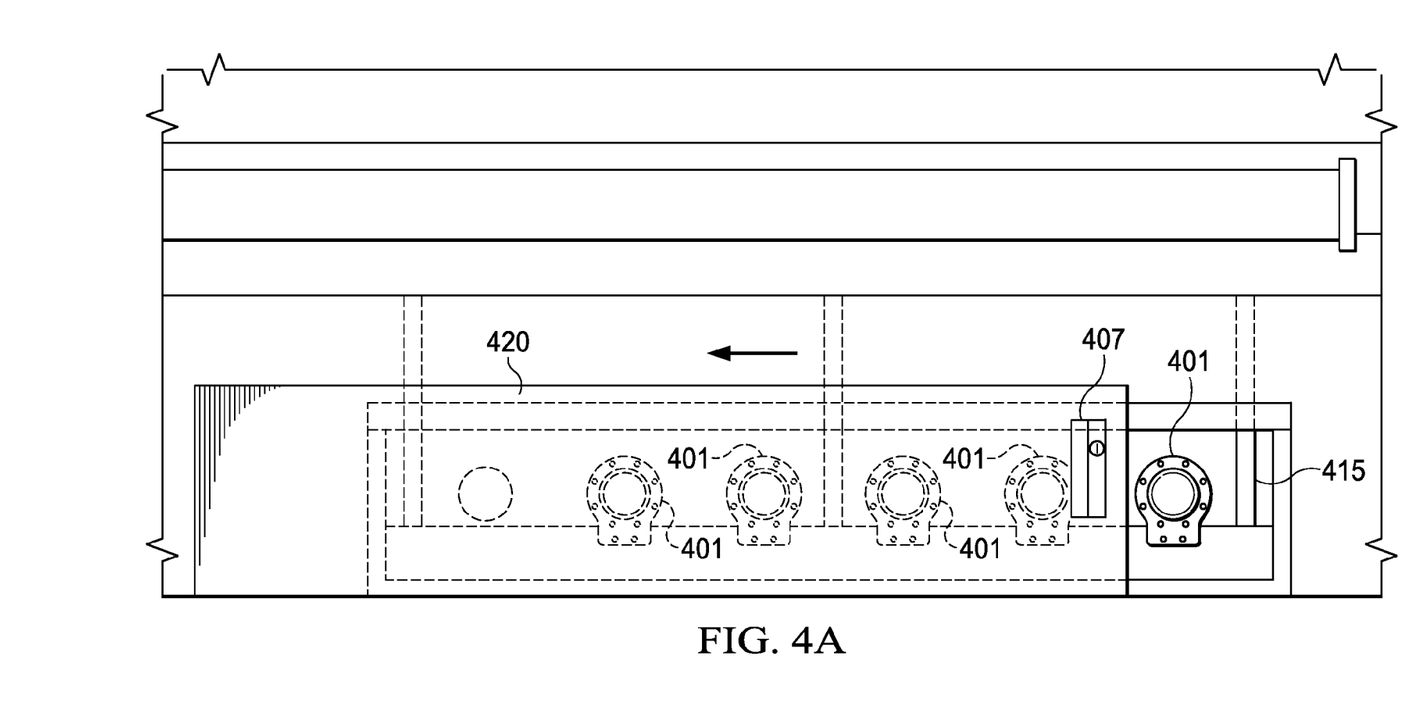
FIG. 4A is a schematic, side view of a portion of a sliding valve access panel.
Figure 4B:
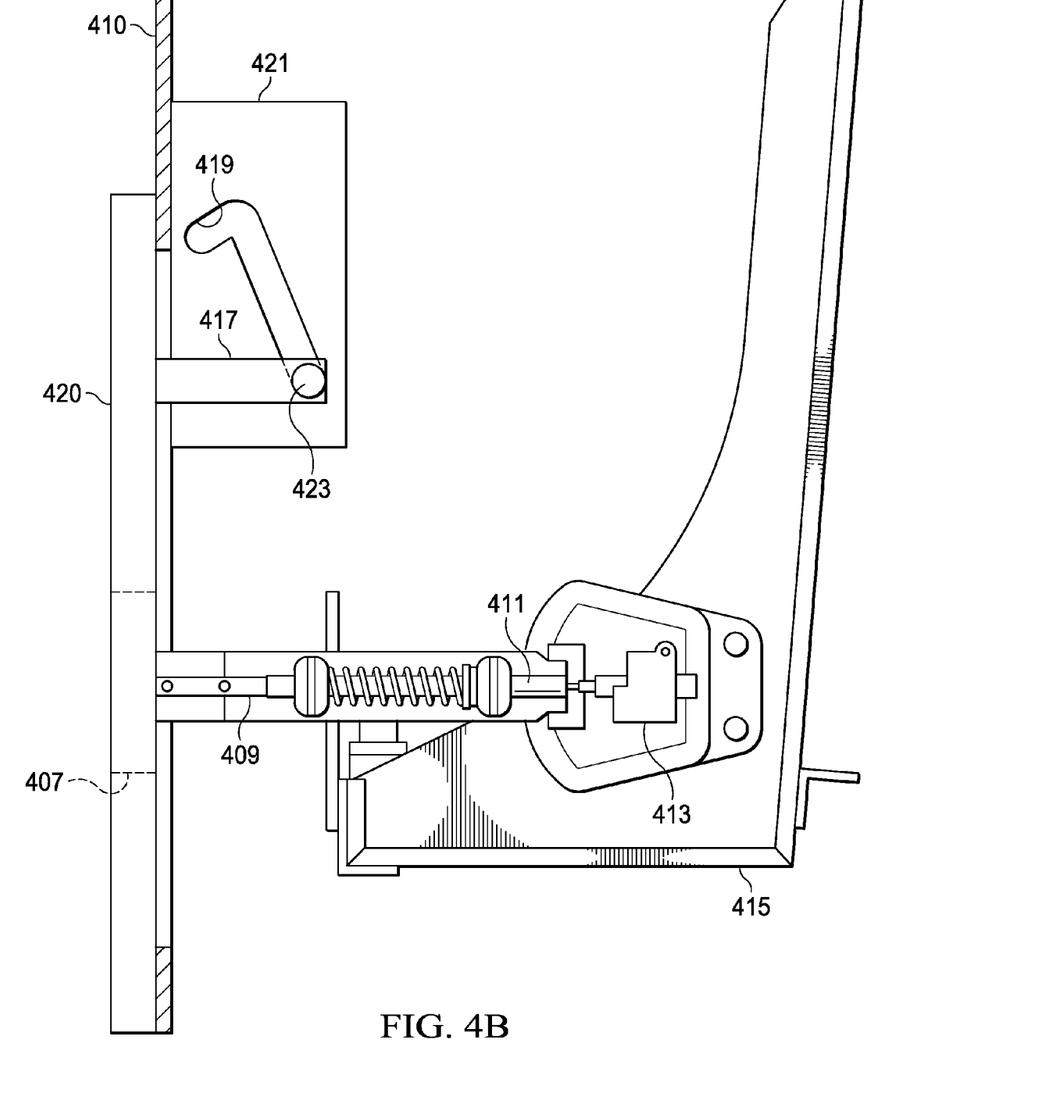
FIG. 4B is a schematic, front view of a the portion of the valve access panel of FIG. 4A.

FIGS. 4A and 4B show another embodiment of a valve access panel 420 that operates similarly to the embodiments described above. The valve access panel 420 differs from the valve access panel 320 of FIGS. 4A and 4B in that the valve access panel 420 is not attached by a simple hinge. Rather, the valve access panel 420 includes a plurality of supporting members 417, each of which includes an anchor 423, which may be a transverse feature such as a bar or bearing that is configured to slide within a slot 419 that is formed within a guide 421 or guide plate. As shown in FIG. 4B, the slot 419 defines a path of motion that the valve access panel 420 follows when opened and, in the illustrated embodiment, directs the valve access panel 420 to move away from the trailer along an upward path. In an embodiment, the slot 419 includes a detent in which the anchor 423 may reset to fix the valve access panel in the open position. In another embodiment, gas springs may be affixed to the valve access panel 420 to assist with moving the valve access panel 420 and may have sufficient spring force to hold the valve access panel 420 in the open position until closed by an operator.

A plurality of guides 421 and supporting members may be affixed to the trailer or aerodynamic skirt 410 and valve access panel 420, respectively, to cause the surface of the valve access panel 420 to remain parallel, or at a constant angular orientation relative to the surface of the trailer or aerodynamic skirt 410. Further, while the path of the slot 419 is generally shown as being diagonal, the slot 419 may alternatively include an arcuate portion to cause the valve access panel 420 to open away from the trailer body before sliding upward to allow access to the valves 401.

Figure 5:
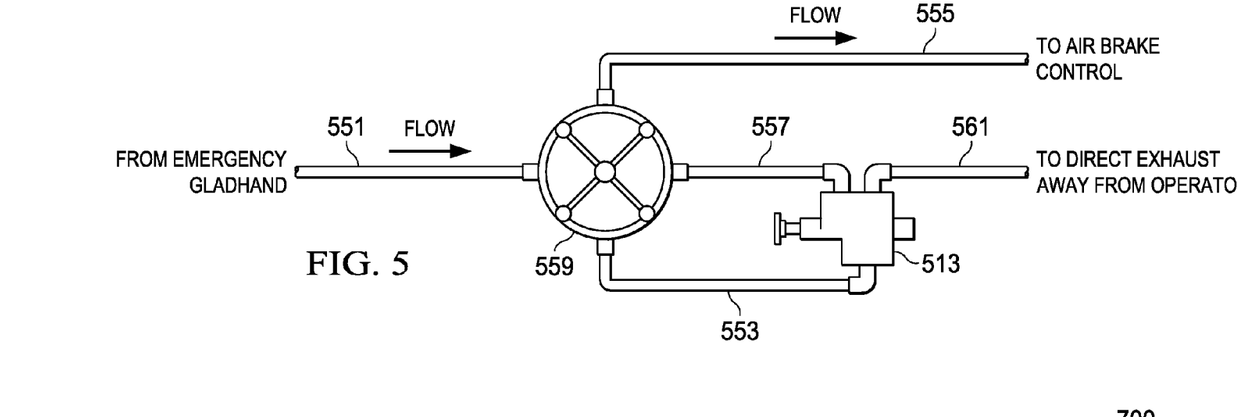
FIG. 5 is a diagram showing a hydraulic-mechanical control system for operating a valve access panel.

FIG. 5 shows a hydraulic control system for operating a valve access panel, such as those described above. The handle of the valve access panel may be coupled to, for example, an actuator that is in turn coupled to a pneumatic controller 513. In reference to the embodiment of FIG. 5, the valve assembly 559 is operable to divert flow of a fluid, such as compressed air, from a supply line 551 to a pneumatic controller 513. The pneumatic controller 513 receives pressurized fluid from an inlet line 557 and is operable to actuate the valve assembly 559 via a pneumatic control line 553. A vent line 561 allows excess pressure or fluid to be vented from the pneumatic controller 513. When actuated, for example when the valve access panel is opened, the pneumatic controller 513 may in turn transmit a control signal to the valve assembly 559, causing flow to be diverted from the supply line 551 to a brake along a brake line 555. This supply of fluid may actuate the brake of the trailer so that the trailer will be restricted from movement when the valves of the trailer are accessible. Similarly, when the valve access panel is closed, the pneumatic controller 513 may cause the valve 559 to cease supplying fluid to the brake, thereby disengaging the brake and allowing movement of the trailer when the valves are closed and inaccessible.

Figure 6:
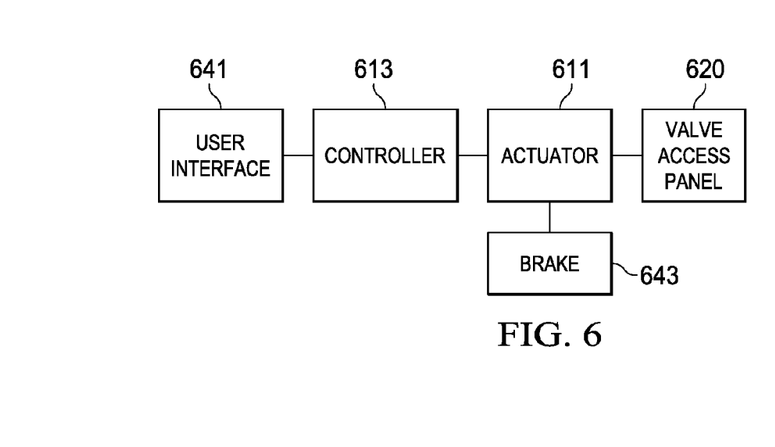
FIG. 6 is a block diagram showing an electro-mechanical control system for operating a valve access panel.

FIG. 6 shows an electronic control system for operating a valve access panel, such as those described above. Here, a user interface 641, which may be a handle or other similar type of input device (e.g., a control button or a touchscreen). The user interface 641 may be coupled to, for example, a controller 613 that is in turn coupled to an actuator 611. The actuator 611 may be a solenoid or similar device coupled to a brake 643. The brake 643 may be, for example, a pneumatic brake, hydraulic brake, an electromechanical brake, or a mechanical brake that restricts movement of the drivetrain of the trailer. The actuator 611 may include a second actuation mechanism, and the actuation mechanism or second actuation mechanism may be coupled to a valve access panel 620 and operable to open the valve access panel 620 upon receipt of a control signal from the controller 613.

Referring again to FIGS. 4A and 4B, in operation, an operator may access the valves 401 by opening a handle 407. The handle 407 is coupled to a mechanical or electronic actuator, and is operable to actuate a latch that retains the valve access panel 420 in the closed position relative to the trailer chassis 415 or the aerodynamic skirt 410. In addition to actuating the latch, the handle also triggers an actuator via an electronic signal or mechanical linkage 409. The actuator signal causes the actuator 411 to actuate a controller 413, which may be an electronic controller or a pneumatic controller, which actuates a brake coupled to the drivetrain of the trailer. In accordance with the foregoing method of operation, when an operator opens a handle 407, the opening of the handle 407 or movement of the valve access panel 420 effectively transmits a control signal through the linkage 409, actuator 411, and controller, to activate a trailer brake. Actuation of the trailer brake in this manner prevents movement of the trailer when the valves 401 are being accessed.

When the operator has accessed the trailer's contents and closed the valves, the operator may be ready to move the trailer. At such time, the operator may close the valve access panel 420, causing the linkage 409 or electronic signal generator to again engage or to disengage the actuator the actuator 411 and in turn the controller 413. In response, the controller 413 causes the brake to disengage and cease restricting movement of the trailer. In this and similar examples, the actuator and linkage may function as an interlock that effectively and automatically links the operation of the valve access panel 420 to the operation of the trailer's braking system such that opening of the valve access panel 420 results in engagement of the trailer brake and closing of the valve access panel results in disengagement of the trailer brake.

The interlock may include various mechanical, electrical, and/or electromagnetic components. In one embodiment, the interlock includes an air valve, represented in FIG. 4B as controller 413, that is configured to actuate the trailer brake in response to the valve access panel 420 being moved into the open position. The air valve is further operable to release the trailer brake in response to the valve access panel 420 being moved into the closed and unlocked position.

In another embodiment, the interlock includes electronic components configured to transmit a first signal to actuate the trailer brake in response to the valve access panel 420 being moved into the open and locked position, and configured to transmit a second signal to release the trailer brake in response to the interlock being moved into the closed and unlocked position. In such embodiment, signals are be transmitted along a wired and/or wireless system to the wheel brake directly or to a control unit and/or an electronic brake control module which then handles actuating or releasing the trailer break.

In a further embodiment, the interlock directly actuates a solenoid brake attached to the wheels of the trailer. In such embodiment, the solenoid brake is selected from a group of braking mechanisms that rely on an electric solenoid for their actuation. For example, the solenoid brake may be either one of two types of pneumatic brake installations: one that exerts braking pressure when power is applied, or another that exerts braking pressure when the power is interrupted. The brake pressure in either case engages the drivetrain of the trailer and restricts the trailer's movement.

In some embodiments in which the interlock includes an electronic component. The electronic component of the interlock may include a processor, a memory, a transceiver, and other components to facilitate communication with other components of the trailer. In one of such embodiments, the electronic component of the interlock transmits a signal to actuate the trailer brake in response to the valve access panel being switched to the locked position. The electronic component of the interlock may also transmit a signal to disengage the trailer brake in response to the valve access panel being switched the unlocked position.

In some embodiments, the trailer brake includes electronic brake sensors configured to actuate or disengage the trailer brake. In such embodiments, the electronic brake sensor may include sensors, such as magnetic, resistive, photo, or other suitable sensors that determine whether the valve access panel is in the open or closed position. In such an embodiment, a controller communicatively coupled to the sensors may actuate engagement of the trailer brake when the electronic brake sensors detect that the valve access panel is in an open position. In such an embodiment, the controller may similarly actuate disengagement of the trailer brake when the electronic brake sensors detect that the valve access panel is in a close position. In any of the foregoing embodiments, a similar sensor may be coupled to the trailer brake to determine whether the brake is engaged or disengaged, and may similarly be coupled to a visual indicator, such as a graphical user interface or red and green LED lights, placed at or near the valves. The visual indicator may indicate to an operator that the brake is engaged and that it is safe to open the valves (e.g., when the light is green), or that the brake is not engaged that that it may therefore be unsafe to open the valves (e.g., when the light is red).

Figure 7:
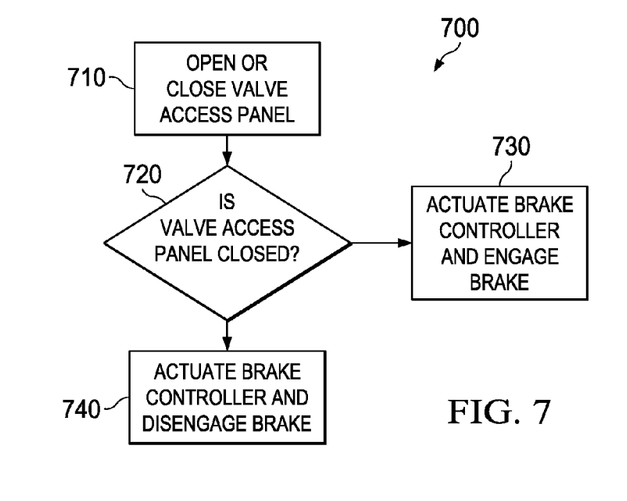
FIG. 7 is a flowchart showing a process for operating the system of FIG. 6.

FIG. 7 is a flowchart showing an illustrative process 700 for operating a tank trailer having a brake, one or more valves, and a valve access panel coupled to the trailer brake via an electronic interlock system in accordance with any of the electronic systems described above. The process 700 may operate periodically, or may be triggered by an operator opening or closing a valve access panel 710. The process 700 includes making a determination as to whether the valve access panel is closed 720. The determination may be made by, for example, using a sensor to determine if the valve access panel is open or closed, or by determining whether an actuation signal has been received from a handle or similar control of the valve access panel. If the panel is open, then the process 700 involves actuating a brake controller to cause the trailer brake to engage 740 and restrict movement of the trailer. If the panel is closed, however, then the process 700 involves actuating a brake controller to cause the trailer brake to disengage 740, thereby allowing movement of the trailer.

Figure 8:
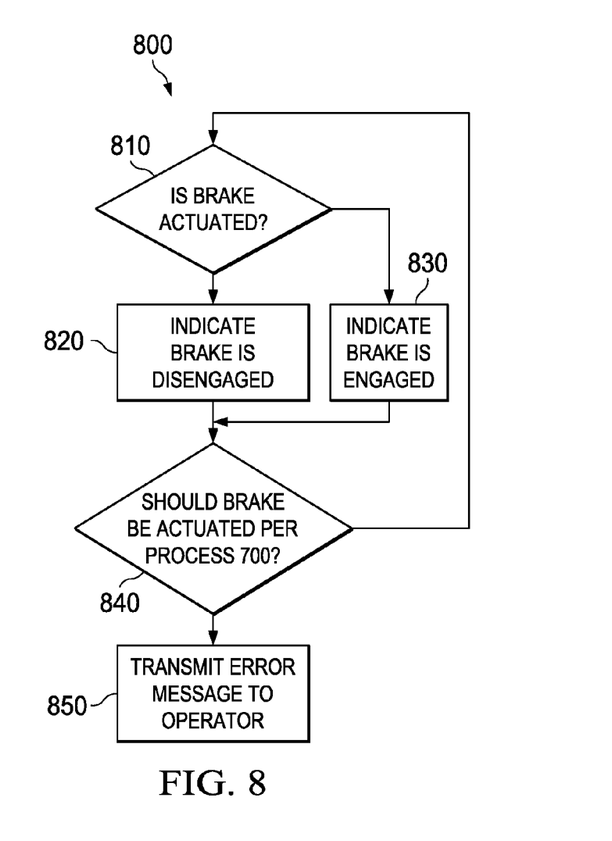
FIG. 8 is a flowchart showing a process for determining whether a trailer brake is actuated.
Figure 9:
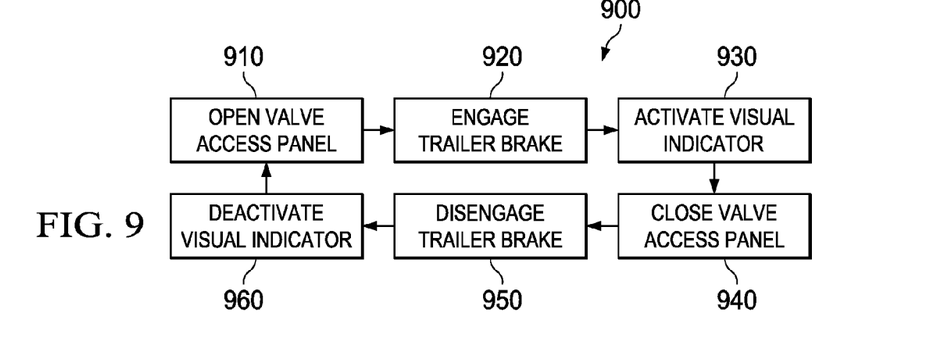
FIG. 9 is a flowchart showing a process for operating a valve access panel coupled to a trailer brake by a mechanical interlock.

The process 800 of FIG. 8 may be executed contemporaneously or in series with the processes 700 and 900 described with regard to FIGS. 7 and 9, respectively. The process 800 process includes making a determination as to whether the trailer brake is actuated 810. This determination may be made using magnetic, resistive, or other suitable sensors that detect whether the brake is engaged. If the brake is engaged, then the process next includes activating a visual indicator (e.g., a red light) or other similar indicator to a trailer operator to indicate that the brake is engaged 830. Alternatively, if the brake is not engaged, then the process next includes activating a second visual indicator (e.g., a green light) or other similar indicator to indicate that the brake is not engaged 820. The process may also include comparing the brake engagement status with the expected status per the processes described with regard to FIG. 7 or 9 840. If it is determined that the brake is disengaged when it should be engaged, or engaged when it should be disengaged, a visual indicator, alarm, or other suitable signal may be activated to inform the operator that the braking system is not operating properly 850. As indicated in FIG. 8, the process may operate continuously or repeatedly to ensure correct operation of the interlock of the valve access panel and brake.

Somewhat analogous to FIG. 7, FIG. 9 is a flowchart showing an illustrative process 900 for operating a tank trailer having a brake, one or more valves, and a valve access panel coupled to the trailer brake via a mechanical electronic interlock system in accordance with any of the primarily mechanical systems described above. The process 900 starts when the operator opens the valve access panel 910 or closes the valve access panel 940. Following opening of the valve access panel 910, an actuator, via a pneumatic, hydraulic, mechanical, or similar control line causes the brake to engage 920 and optionally transmits a signal to, for example, a visual indicator to inform the operator that the brake is activated 930. Following closing of the valve access panel 940 the actuator, via a pneumatic, hydraulic, mechanical, or other suitable control causes the trailer brake to disengaged 950, and optionally transmits a signal to, for example, the visual indicator to inform the operator that the brake is deactivated 960.

Various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

It will be understood that when the terms "includes," "comprises," "including," and/or "comprising," when used in this specification, specify the presence of stated elements and/or components, but do not preclude the presence or addition of one or more elements and/or components thereof. The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless explicitly so stated. The different embodiments, features, and description for the fairings may be utilized in any number of combinations and are not limited to a particular embodiment.

The terms "front", "forward" and similar terms refer to the end of a trailer, or a component or portion of a trailer, which is nearest the tractor when the trailer is in use on a highway. The terms "back", "rearward" and similar terms refers to the end of a trailer, or a component or portion of a trailer, which is farthest away from the tractor when the trailer is in use on a highway. The illustrative embodiments may be applied to trailers, vehicles, trains, or other moving apparatuses.

What is claimed is:

1. A trailer comprising:
a trailer body having an undercarriage;
a drivetrain coupled to the undercarriage, the drivetrain comprising one or more wheels and a brake, the brake being operable to restrict movement of the wheels;
a valve coupled to a container of the trailer body; the valve being positioned along a first side of the undercarriage and oriented such that a valve outlet is directed away from the first side of the undercarriage;
an aerodynamic skirt extending along the first side of the undercarriage, the aerodynamic skirt comprising a valve access panel proximate the valve, wherein the valve access panel is movable between an open position and a closed position, the valve access panel permitting access to the valve when in an open position and covering the valve when in a closed position; and
an interlock coupled to the brake and to the valve access panel, the interlock being operable to engage the brake when the valve access panel is moved from the closed position.

2. The trailer of claim 1, wherein the interlock comprises an air valve configured to actuate the brake in response to the valve access panel being moved from the closed position, and further configured to release the brake in response to the valve access panel being moved into the closed position.

3. The trailer of claim 1, wherein the interlock comprises:
an electronic component operable to transmit a first control signal to actuate the brake in response to valve access panel being moved from the closed position, and further operable to transmit a second control signal to release the brake in response to the valve access panel being moved into the closed position.

4. The trailer of claim 1, wherein the valve access panel comprises a rectangular panel coupled to the aerodynamic skirt by a hinge.

5. The trailer of claim 1, wherein the valve access panel comprises a rectangular panel coupled to the aerodynamic skirt by a linkage.

6. The trailer of claim 1, wherein the valve access panel comprises a handle, wherein the handle is coupled to an actuator, the actuator being operable to cause the brake to engage when the valve access panel is moved from the closed position and to disengage the brake when the valve access panel is moved to the closed position.

7. The trailer of claim 1, further comprising a sensor coupled to the trailer and operable to determine whether the valve access panel is in the closed position, the sensor being coupled to an actuator of the interlock, wherein the actuator is operable to cause the brake to engage when the valve access panel is moved from the closed position and to disengage the brake when the valve access panel is moved to the closed position.

8. The trailer of claim 7, further comprising a second sensor operable to determine whether the brake is engaged, and a controller coupled to the sensor and second sensor, the controller being coupled to a visual indicator and operable to activate the visual indicator upon determining that the brake is disengaged and the valve access panel is open.

9. The trailer of claim 7, further comprising a second sensor operable to determine whether the brake is engaged, and a controller coupled to the sensor and second sensor, the controller being coupled to a visual indicator and operable to activate the visual indicator upon determining that the brake is engaged and the valve access panel is closed.

* * * * *